Patented Sept. 2, 1941

2,254,806

UNITED STATES PATENT OFFICE 2,254,806

PROCESS OF PRODUCING HYDROCARBONS FROM CARBON MONOXIDE AND HYDROGEN

Wilhelm Michael, Ludwigshafen-on-the-Rhine, Germany, assignor, by mesne assignments, to William E. Currie, New York, N. Y.

No Drawing. Application August 19, 1938, Serial No. 225,727. In Germany August 26, 1937

2 Claims. (Cl. 260—449)

The present invention relates to the conversion of carbon monoxide with hydrogen into hydrocarbons having more than one carbon atom in the molecule.

I have found that by the said conversion of carbon monoxide with hydrogen, which is carried out at elevated temperatures, valuable products, in particular low-boiling hydrocarbons of the boiling range of benzines and heavy benzines are obtained by using as catalysts sintered heavy metals to which there are added alkali metal compounds which in aqueous solution have a neutral or acid reaction and which are practically undecomposed at temperatures up to 1000° C.

For the preparation of the sintered heavy metals (which are advantageously those of the 8th group of the periodic system, especially of the iron group and in particular iron itself) there may be mentioned in particular metal powders or porous metals.

The metal powders may be prepared in any suitable way, as for example by decomposition of organo-metallic compounds, such as iron carbonyl, or by reduction of pulverulent metal oxides or hydroxides or by the decomposition and reduction of suitable other metal compounds, such as carbonates, nitrates, or oxalates.

Porous metals suitable for sintering can be prepared by reduction of pieces of metal oxides or hydroxides or by pressing metal powders, as for example pulverulent carbonyl iron.

The sintering of the metals is effected by heating to temperatures above 500° C., advantageously above 600° C., as for example at 700°, 800°, 900° or 1000° C., in such a manner, i. e. for so long a time, that a visible decrease in volume (preferably more than 10 per cent takes place); in the case of metal powders the powder particles agglomerate and in the case of porous metals there is a decrease in porosity. Non-oxidizing gases, such as nitrogen, may be present during the sintering. In many cases it is advantageous to work in the presence of reducing gases, such as hydrogen or gases containing hydrogen. The sintering may also be carried out in vacuo. When starting from reducible metal compounds, these may first be converted into the metals by treatment at relatively low temperatures, as for example at from 400° to 500° C., with reducing gases, whereby no sintering takes place, and then sintered at above 500°, advantageously above 600° C. in the presence of non-oxidizing gases or in vacuo. The reduction and sintering may, however, also be effected in one single operation, for example by treating an oxide at temperatures above 500° (as for example 850°) C. with reducing gases for such a length of time that not only a reduction but also a sintering of the metal formed by the reduction takes place. The speed of flow and the partial pressure of the hydrogen should be adapted to the speed of reduction of the metal compound treated.

The sintering may also be effected in different stages of pressure, for example by first working at atmospheric pressure and then, at the same or a different temperature, under superatmospheric pressure, as for example at 2, 5, 10, 50, 100 atmospheres or more. The sintering in one stage may also be effected under superatmospheric pressure.

As alkali metal compounds to be added there may be mentioned in particular alkali metal halides, as for example potassium chloride, potassium bromide, sodium chloride, or sodium fluoride. Other alkali metal compounds which are practically undecomposed at temperatures up to 1000° C. may also be added, as for example the non-alkaline reacting phosphates of sodium and potassium, such as monosodium phosphate and monopotassium phosphate. Generally speaking the said alkali metal compounds are added in an amount of 0.5, 2, 5, 10, 15 per cent by weight or more (with reference to the metal used). In many cases, additions of 0.1 per cent and less are sufficient.

The alkali metal compounds may be added to the metals used as catalysts before or after or even during the sintering. For example metallic iron which has been obtained by decomposition of iron carbonyl may be mixed in the moistened state with solid potasssium chloride before the sintering. Iron compounds, such as oxides or hydroxides, may also have sodium bromide added thereto before their reduction to metallic iron. In many cases it is advantageous to bring the alkali metal compounds in aqueous solution onto the metal or the metal compound to be reduced.

The metal powders or porous metals may have added to them, in addition to the said alkali metal compounds, other substances for the purpose of increasing their activity, as for example the oxides or hydroxides of aluminum, silicon dioxide, kieselguhr, compounds of copper, titanium, manganese, tungsten, molybdenum, chromium, thorium, cerium, zirconium or other rare earths.

The reaction of carbon monoxide and hydrogen may be carried out in the gas phase or in the presence of a liquid medium or in the liquid phase. In the latter case there is preferably used as the liquid medium liquid or fusible hydrocarbons, as for example mineral oils or their fractions, tar oils, destructive hydrogenation products or paraffin wax, and especially advantageously oils which have been obtained by the reaction of carbon monoxide and hydrogen, preferably under the same conditions.

The initial gases, carbon monoxide and hydrogen, may be used in the same proportions by volume, but more carbon monoxide than hydrogen or more hydrogen than carbon monoxide may also be present. Additional amounts of carbon monoxide or hydrogen or both gases may also be added at different parts of the reaction vessel. In many cases it is advantageous to react gas mixtures having more than 50 per cent, as for example from 60 to 70 per cent, of carbon monoxide.

The reaction of the carbon monoxide and hydrogen is advantageously carried out at temperatures between about 180° and 450° C. and preferably at increased pressures, such for example as 5, 10, 20, 50, 100 atmospheres or more. Atmospheric pressure may, however, also be used.

The following example will further illustrate the nature of this invention but the invention is not restricted to this example.

*Example*

Iron powder which has been obtained by thermal decomposition of iron carbonyl is made into a paste with 5 per cent by weight of potassium chloride stirred into the same weight of water, then heated, pressed into pills of the size of peas and then treated for 4 hours with hydrogen at 850° C. The catalyst thus obtained is charged into a reaction vessel into which a gas mixture of 35 per cent of carbon monoxide, 64 per cent of hydrogen and 1 per cent of nitrogen is led at 330° C. under a pressure of 15 atmospheres. A liquid product is thus formed of which a few per cent consists of oxygen-containing derivatives of hydrocarbons and of which about 95 per cent boils in the boiling range of benzine.

What I claim is:

1. A process for the conversion of carbon monoxide with hydrogen to produce hydrocarbons containing more than one carbon atom in the molecule which comprises operating in the presence, as catalyst, of sintered iron to which an alkali metal compound which in aqueous solution has a neutral or acid reaction, has been added.

2. A process for the conversion of carbon monoxide with hydrogen to produce hydrocarbons containing more than one carbon atom in the molecule which comprises operating in the presence, as catalyst, of sintered iron to which an alkali metal halide has been added.

WILHELM MICHAEL.